United States Patent Office 2,737,272
Patented Mar. 6, 1956

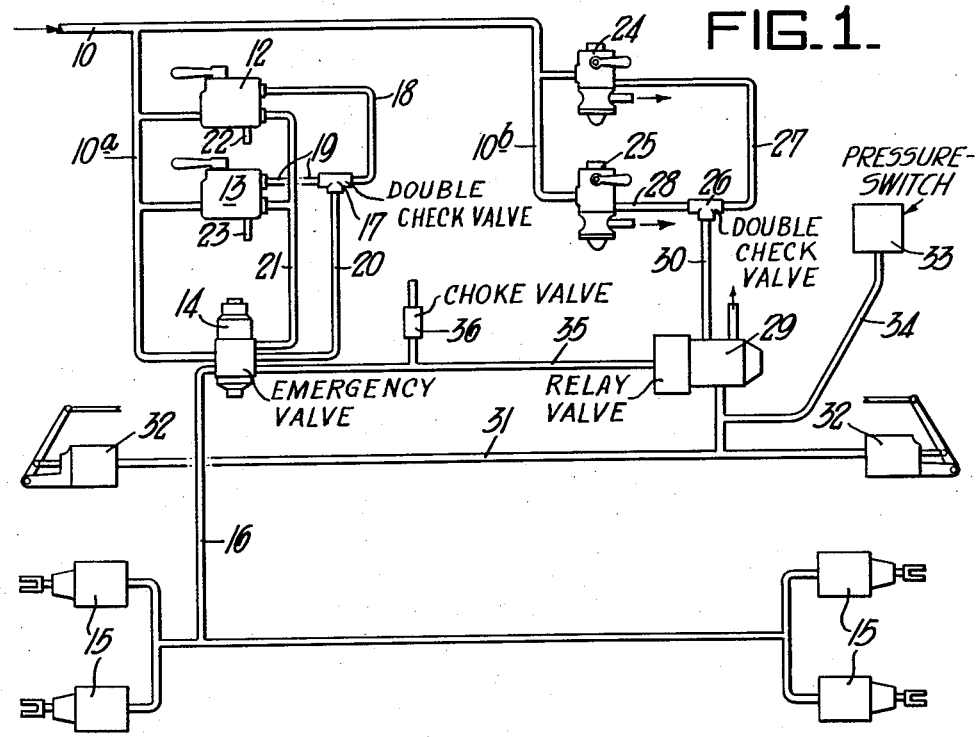

2,737,272

PNEUMATIC BRAKE AND THROTTLE SYSTEM

Alfred Freeman, Chicago, Ill., assignor to United States Steel Corporation, a corporation of New Jersey Application April 9, 1952, Serial No. 281,349

6 Claims. (Cl. 192—3)

This invention relates to pneumatic brake and throttle systems, and particularly to a mechanism which positively prevents operation of such systems following an emergency application of the brakes unless the operator first returns the throttle controller to its idle or stop position.

The invention is applicable broadly to any pneumatic control where pressure differentials in one circuit interrupt air flow in a second circuit and where it is desired not to actuate the second circuit until the pressure differential in the first circuit is restored and further not until after pressure is relieved in the second circuit. One example of a control to which the invention is especially suited is in Diesel-electric locomotives. Both the brakes and throttle of such locomotives commonly are controlled by pneumatic circuits. The two circuits are interconnected whereby an extreme pressure differential in the brake circuit, such as that caused by emergency application of the brakes, automatically shuts off the throttle circuit. However, previous controls with which I am familiar either require considerable extra equipment to prevent automatic re-operation of the throttle circuit after emergency stops or else they lack any positive means for requiring the operator to return the control to idle position. Lacking such means, the locomotive can start out of control as soon as the brakes are released after an emergency stop, unless the operator in the meantime remembers to return the throttle controller to its idle or stop position.

An object of the present invention is to provide an improved brake and throttle system in which a relatively small alteration in the existing relay valve used in such systems positively prevents operation following an emergency stop until the operator returns the controller to its idle or stop position.

A further object is to provide such a mechanism which not only requires no extra equipment, but also eliminates the need for safety devices presently used, such as a knock-out cylinder and canopy switch operated thereby.

A further object is to provide an improved relay valve which after operating does not return to its former position until pressure in the circuit it controls has been cut off.

In accomplishing these and other objects of the invention, I have provided improved details of structure, a preferred form of which is shown in the accompanying drawing, in which:

Figure 1 is a schematic showing of a pneumatic circuit of the class to which the present invention is applicable;

Figures 2, 3 and 4 are longitudinal sectional views of a relay valve constructed in accordance with the present invention in its different positions; and Figure 5 is a schematic sectional view of a typical double check valve which can be used in my circuit.

Figure 1 shows schematically a pneumatic brake circuit and throttle circuit typical of those used, for example, in Diesel-electric locomotives. Both circuits are connected to a common compressed air supply via a main air supply line 10, which has branches 10a and 10b leading to the brake and throttle circuits respectively.

The brake circuit includes a pair of alternative brake actuating valves 12 and 13 and an emergency valve 14, all of the self-lapping or graduating type. Thus the farther any of these valves are open, the greater the pressure of air they transmit. The inlet ports of the three valves are connected to the branch air supply line 10a. The discharge port of the emergency valve 14 is connected to the different brake cylinders 15 via brake lines 16. The normal outlet ports of the brake actuating valves 12 and 13 are connected to a double-check valve 17 via pipes 18 and 19 respectively, and thence to a control port of the emergency valve 14 via a pipe 20. An emergency air line 21 is connected to appropriate ports in the three valves 12, 13 and 14. The two valves 12 and 13 have exhaust ports 22 and 23 respectively.

To apply the brakes normally, the operator can open either valve 12 or 13. Air then flows from the branch 10a, through one of these valves and pipe 18 or 19, double-check valve 17 and pipe 20 to the emergency valve 14, which it opens. Thereupon valve 14 transmits air from the branch 10a to the brake lines 16 and thence to the various brake cylinders. The farther valve 12 or 13 is opened, the greater the pressure transmitted to valve 14, the farther this valve opens, and the farther the brakes are applied. If either valve 12 or 13 is opened to its emergency position, air exhausts from the emergency valve 14 via line 21 and port 22 or 23 so as to apply the full pressure of the air supply from branch 10a through the emergency valve to the brake cylinders, thus giving rapid and full pressure braking.

The throttle circuit includes alternative controllers 24 and 25, also in the form of self-lapping or graduating type valves. The inlet ports of said controllers are connected to the branch air supply line 10b. Their outlet ports are connected to a double-check valve 26 via pipes 27 and 28 and thence to a relay valve 29 via a pipe 30. The novelty in the present invention is in the construction of relay valve 29, and this valve is described fully hereinafter. Normally the relay valve is open and simply transmits pressure from pipe 30 to a system of throttle lines 31, which lead to actuators 32. The farther either of the controllers 24 or 25 is opened, the greater the pressure transmitted to the actuators and the faster the engine operates. A pressure switch 33 also can be connected to the throttle line 31 via a pipe 34. Switch 33 can have electric contacts which are connected in the circuit that governs operation of the main power contactors. Thus opening of the throttle controllers also can close the electric power circuit.

The brake and throttle circuits are interconnected so that emergency operation of the brakes automatically releases the pressure on the actuators 32 and the pressure switch 33 and thus in effect closes the throttle. The connection includes a pipe 35 which is connected to a second outlet port of the emergency valve 14 and to a control port of the relay valve 29, and which carries a choke valve 36. When the operator turns the valve 12 or 13 to produce an emergency application of the brakes, the full pressure of branch 10a is transmitted via pipe 35 to the relay valve 29. This valve operates to close off pipe 30 and to exhaust the pressure from the throttle lines 31, actuators 32 and pressure switch 33, thus in effect closing the controllers.

The circuits and the individual parts (except the relay valve) described thus far are known and therefore not shown nor described in greater detail. The various valves and other parts are available commercially from manufacturers of air braking equipment. However by a unique construction of relay valve 29, the present invention assures that after the operator releases the brakes following an emergency application, no pressure can be transmitted to the actuators 32 and switch 33 until both controllers 24 and 25 first have been moved to their idle or stop positions, in which they release the pressure within pipe 30. Release of the brakes after an emergency stop allows air to bleed rapidly from pipe 35 via the choke valve 36, but such bleeding does not restore the relay valve 29 to its normal position until the controllers are closed.

Figures 2, 3 and 4 show in detail a preferred construction of relay valve 29 in accordance with the present invention, except that the arrangement of passages in the valve body is shown somewhat schematically to afford a clearer illustration. Figure 2 shows the parts in their normal position, Figure 3 after emergency application of the brakes, and Figure 4 after release of the brakes, but before the controller 24 or 25 has been closed. The valve comprises a hollow body, which is formed of a top chamber casting 40, a main body casting 41, a lower body casting 42, and a bottom chamber casting 43, all rigidly fixed together. A flexible diaphragm 44 extends across the body cavity between the castings 40 and 41. A diaphragm plunger 45 is mounted in the main body casting for up and down movement beneath the diaphragm 44. A diaphragm spring 46 encircles said plunger and normally holds it and the diaphragm in their upper position (Figure 2). The portion of the body cavity occupied by the diaphragm 44, plunger 45 and spring 46 conveniently can be referred to as an upper chamber. A slide formed of a sleeve 47 and a disk 48 rigidly fastened together is mounted for up and down movement in the lower body casting 42. A spring 49 which is situated in the bottom chamber casting 43 normally holds the slide 47, 48 in its upper position where the upper face of its disk abuts the lower end of the plunger 45 (Figure 2). However it is to be pointed out that the end of the plunger and the disk are free of each other.

The main body casting 41 has a passage 50 which leads to a central chamber 51 above the disk 48. The main body casting 41, lower body casting 42 and bottom chamber casting 43 together have a passage 52 which leads to the interior of the bottom chamber. Pipe 30 from the controllers is connected to passage 50 and the throttle lines 31 to passage 52. Sleeve 47 has a lengthwise passage 53, which in the normal upper position of the slide establishes free communication between passages 50 and 52 and thus allows either of the controllers 24 or 25 to apply operating pressure to the actuators 32.

The main body casting 41 and the top chamber casting 40 have a passage 54 leading to this top chamber. Pipe 35 from the emergency valve 14 is connected to this passage. When there is an emergency application of the brakes, air from the emergency valve acts against the diaphragm 44 and forces the plunger 45 and valve slide 47, 48 to their lower position against the action of springs 46 and 49 (Figure 3), whereupon disk 48 closes off the bottom of chamber 51 and thus closes off pipe 30. The main body casting 41 and lower body casting have an exhaust passage 55. The lower end of the sleeve 47 has an external flange 56 which in the normal position of the valve shown in Figure 2 seats upwardly against the bottom of the lower body casting 42 and closes off this exhaust. When the sleeve moves to its lower position shown in Figure 3, the flange 56 moves away from its seat and establishes communication between passages 52 and 55 and thus exhausts the air from the throttle lines 31.

When the brakes are released following an emergency application, pressure is released from above the diaphragm 44 via the choke valve 36. The spring 46 returns the plunger 45 to its normal upper position. However, as long as either controller 24 or 25 remains open, pressure from the air supply is transmitted to chamber 51 via pipe 30 and passage 50. This pressure acts against the top of the disk 48 and holds the slide 47, 48 in its lower position against the action of spring 49 where, as already explained, the disk closes off the pipe 30 and opens the throttle lines 31 to the exhaust passage 55 (Figure 4). The slide 47, 48 cannot return to its normal upper position until both controllers 24 and 25 are closed, relieving the pressure in chamber 51, whereupon the spring 49 returns the slide to its upper position. Thus the relay valve positively prevents transmission of air to the actuators until the controllers are closed. The purpose of the double check valve 26 is to close off whichever delivery pipe 27 or 28 is not in use. Hence it does not interfere with the venting of pipe 30 via the other pipe 27 or 28.

The only actual alteration necessary to commercial relay valves to achieve the purposes of the present invention is in the construction of the slide 47, 48. Thus by a simple change in a few elements the present invention renders circuits of the type described safe and virtually fool-proof. At the same time the need for elaborate safety devices is eliminated.

While I have shown and described only a single embodiment of the invention, it is apparent that modifications may arise. Therefore, I do not wish to be limited to the disclosure set forth but only by the scope of the appended claims.

I claim:

1. In a pneumatic brake and throttle system which comprises brake operating valves adapted to apply the brakes either normally or under full pressure for emergencies, a throttle controller having open and closed positions, pneumatic brake and throttle circuits in which said valves and controller respectively are connected, a relay valve in said throttle circuit, and a connection between said brake circuit and said relay valve for applying pressure to the latter and thereby closing said throttle circuit on emergency application of the brakes and for relieving the latter pressure on release of the brakes, the combination with said relay valve of means therein which maintains said throttle circuit closed after emergency application of the brakes and subsequent release thereof until said throttle controller is returned to its closed position.

2. In a pneumatic brake and throttle system which comprises brake operating valves adapted to apply the brakes either normally or under full pressure for emergencies, a throttle controller having open and closed positions, pneumatic brake and throttle circuits in which said valves and controller respectively are connected, a relay valve in said throttle circuit, and a connection between said brake circuit and said relay valve for operating the latter and thereby closing said throttle circuit on emergency application of the brakes, said relay valve including walls containing passages connected to said controller, to the throttle, and to an exhaust, a slide normally establishing communication between the throttle and controller and closing off said exhaust, and diaphragm means operated by the connection from said brake circuit for changing the position of said slide, the combination with said slide of a disk affixed thereto and being free of said diaphragm means for maintaining said throttle circuit closed after emergency application of the brakes and subsequent release thereof until said throttle controller is returned to its closed position releasing pressure from said disk.

3. In a pneumatic brake and throttle system which comprises brake operating valves adapted to apply the brakes either normally or under full pressure for emergencies, a throttle controller having open and closed positions, pneumatic brake and throttle circuits in which said valves and controller respectively are connected, a relay valve in said throttle circuit, and a connection between said brake circuit and said relay valve for operating the latter and thereby closing said throttle circuit on emergency application of the brakes, said relay valve including walls containing passages connected to said controller, to the throttle and to an exhaust, a slide normally establishing communication between the throttle and controller and closing off said exhaust, a spring urging said slide to its normal position, and a diaphragm, plunger and spring adapted to be operated by the connection from said brake circuit for changing the position of said slide, the combination with said slide of a disk rigidly affixed thereto and being free of said plunger and adapted to be acted on by pressure in said throttle circuit transmitted by said controller for maintaining said throttle circuit closed against the action of said first named spring after emergency application of the brakes and subsequent release thereof until said controller is returned to its closed position releasing pressure from said disk.

4. In a pneumatic system which includes a pair of interconnected circuits, both of which contain controlling valves and one of which contains a relay valve operated by application of pressure from the other for automatically closing the circuit containing the relay valve on the occurrence of extreme pressure differentials in the other and for relieving pressure on the relay valve on restoration of normal pressure in this other circuit, means in said relay valve for automatically preventing re-operation of the circuit containing the relay valve until the controlling valve of this circuit has been returned to its closed position.

5. In a pneumatic system which includes a pair of interconnected circuits, both of which contain controlling valves and one of which contains a relay valve operated by application of pressure from the other for automatically closing the circuit containing the relay valve on the occurrence of extreme pressure differentials in the other and for relieving pressure on the relay valve on restoration of normal pressure in this other circuit, said relay valve including walls containing passages connected to opposite sides of the circuit in which it is contained and an exhaust, a slide normally establishing communication between the two sides of the circuit and closing off said exhaust, and diaphragm means operated by the other circuit for changing the position of said slide, the combination with said slide of a disk affixed thereto and being free of said diaphragm for maintaining the circuit containing the relay valve closed after operation of said relay valve until the controlling valve of this circuit is closed.

6. An air relay valve comprising a hollow body having an upper chamber, a central chamber, a lower chamber spaced from said central chamber, and air passages from its exterior communicating respectively with said upper chamber, with said central chamber, with said lower chamber, and with the space between said central and lower chambers, means for applying pressure to the first named passage, means for selectively supplying air to or venting the second named passage, means for delivering air from the third named passage, the fourth named passage being open to the surrounding atmosphere, a diaphragm, plunger and spring mounted in said upper chamber, a slide mounted in the space between said central and lower chambers and having a passage adapted to furnish communication between these chambers, a disk rigidly affixed to the top of said slide within said central chamber and adapted to abut the lower end of said plunger but being free of mechanical connection therewith, a flange on the lower end of said slide within said lower chamber, said body having a first seat at the bottom of said central chamber adapted to be engaged by said disk for preventing flow of air therepast and a second seat at the top of said lower chamber adapted to be engaged by said flange for preventing flow of air therepast, and a spring urging said slide to a position where said flange engages said second seat and said disk is free of said first seat, the force of said second named spring being sufficient to hold said slide in this position against flow of air from said central chamber to said bottom chamber via said slide, but insufficient to move said slide to this position against the pressure in said central chamber after said plunger has moved said slide to a position where said disk engages said first seat until after said central chamber is vented via the second named passage.

References Cited in the file of this patent

UNITED STATES PATENTS

| | | |
|---|---|---|
| 2,170,137 | George | Aug. 22, 1939 |
| 2,417,278 | Van Der Werff | Mar. 11, 1947 |
| 2,477,247 | Haberland | July 26, 1949 |
| 2,490,999 | Sexton | Dec. 13, 1949 |

FOREIGN PATENTS

| | | |
|---|---|---|
| 540,069 | France | July 5, 1922 |